US008631319B2

(12) United States Patent
Hakamata

(10) Patent No.: US 8,631,319 B2
(45) Date of Patent: Jan. 14, 2014

(54) DOCUMENT DATABASES MANAGED BY FIRST AND SECOND AUTHENTICATION METHODS

(75) Inventor: Rie Hakamata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 10/444,592

(22) Filed: May 23, 2003

(65) Prior Publication Data

US 2004/0030700 A1 Feb. 12, 2004

(30) Foreign Application Priority Data

May 27, 2002 (JP) ................................. 2002-152384

(51) Int. Cl.
*G06F 17/00* (2006.01)
(52) U.S. Cl.
USPC ............................... 715/234; 726/27; 726/28
(58) Field of Classification Search
USPC ......... 715/513, 501.1, 234, 255; 707/9, 10, 1, 707/200, 8; 713/200, 202; 726/2, 27, 28, 726/26, 29, 30, 8; 709/217, 225, 203, 223
See application file for complete search history.

(56) References Cited

U.S. PATENT DOCUMENTS

| | | | | | |
|---|---|---|---|---|---|
| 5,944,824 | A | * | 8/1999 | He ...................................... | 726/6 |
| 6,000,033 | A | * | 12/1999 | Kelley et al. .................... | 713/201 |
| 6,052,785 | A | * | 4/2000 | Lin et al. ............................ | 726/5 |
| 6,067,623 | A | * | 5/2000 | Blakley et al. .................... | 726/5 |
| 6,144,959 | A | * | 11/2000 | Anderson et al. ..................... | 1/1 |
| 6,199,077 | B1 | * | 3/2001 | Inala et al. .................. | 715/501.1 |
| 6,219,790 | B1 | * | 4/2001 | Lloyd et al. ..................... | 726/14 |
| 6,243,816 | B1 | * | 6/2001 | Fang et al. ..................... | 713/202 |
| 6,286,104 | B1 | * | 9/2001 | Buhle et al. ........................ | 726/4 |
| 6,412,073 | B1 | * | 6/2002 | Rangan .......................... | 713/202 |
| 6,490,619 | B1 | * | 12/2002 | Byrne et al. ................... | 709/223 |
| 6,496,855 | B1 | * | 12/2002 | Hunt et al. ..................... | 709/217 |
| 6,662,228 | B1 | * | 12/2003 | Limsico ........................ | 709/225 |
| 6,816,869 | B2 | * | 11/2004 | Kagalwala et al. ........ | 707/103 R |
| 6,826,692 | B1 | * | 11/2004 | White ................................ | 726/8 |

(Continued)

FOREIGN PATENT DOCUMENTS

JP 2002-073556 3/2002

OTHER PUBLICATIONS

DB2 Parallel Edition for AIX, Administration Guide and Reference, First Edition, Nov. 30, 1995, Authentication Type section, p. 119-120, Issue 1, IBM Japan. (Partial translation enclosed).

*Primary Examiner* — Adam M Queler
(74) *Attorney, Agent, or Firm* — Cowan, Liebowitz & Latman, P.C.

(57) ABSTRACT

There is provided a document management system that eliminates the necessity of performing such a complicated operation as to input a password by the user each time he/she tries to open any of document databases, thus improving the operability or the like for the user. A plurality of document databases are provided, which are capable of being accessed by a client apparatus via a communication medium. A document management apparatus manages the plurality of document databases such that different authentication methods are used for respective ones of the plurality of document databases when one of the at least one client apparatus having made an access request so as to open any of said plurality of document databases is authenticated, and makes settings such that the one client apparatus is not required to be authenticated again when accessing another one of said plurality of document databases after the one client apparatus has been authenticated.

12 Claims, 4 Drawing Sheets

(56) References Cited

U.S. PATENT DOCUMENTS

| | | | |
|---|---|---|---|
| 6,834,341 B1 * | 12/2004 | Bahl et al. | 713/156 |
| 6,941,472 B2 * | 9/2005 | Moriconi et al. | 726/11 |
| 7,194,764 B2 * | 3/2007 | Martherus et al. | 726/8 |
| 7,350,229 B1 * | 3/2008 | Lander | 726/8 |
| 2003/0093690 A1 * | 5/2003 | Kemper | 713/201 |
| 2003/0200465 A1 * | 10/2003 | Bhat et al. | 713/202 |
| 2004/0024764 A1 * | 2/2004 | Hsu et al. | 707/9 |
| 2004/0039827 A1 * | 2/2004 | Thomas et al. | 709/228 |
| 2007/0088706 A1 * | 4/2007 | Goff | 707/10 |

* cited by examiner

DOCUMENT DATABASES MANAGED BY FIRST AND SECOND AUTHENTICATION METHODS

BACKGROUND OF THE INVENTION

1. Field of the Invention

The present invention relates to a document management system, a document management apparatus, an authentication method, which can be suitably used to improve, for example, the operability in authenticating the user who is accessing a document database, and a program for implementing the method, as well as a storage medium storing the program.

2. Description of the Related Art

Conventionally, a document management system has been used which is capable of creating and managing a plurality of document databases. In such a document management system, the user trying to access each document database is authenticated according to user information stored in the document database. Therefore, in the case where the user tries to use each document database managed by the document management system, he/she is usually authenticated by an authentication method peculiar to the document management system.

In the above conventional document management system, however, the user needs to perform a very complicated operation since he/she is required to be authenticated each time he/she opens any of a plurality of document databases even though they are managed by the same document management system. Specifically, even if the user has been authenticated when opening any of document databases, he/she user is required to be authenticated again when opening another document database. Thus, the user is required to perform such a very complicated operation as to input a password and other information each time he/she tries to open each of document databases.

Further, in terms of the management of the document management system, it is very complicated to maintain and manage the document management system since it is necessary to register and manage users for respective document databases. Further, there is the possibility of password leakage since collation passwords to be collated with passwords inputted by users are stored in respective document databases.

SUMMARY OF THE INVENTION

It is an object of the present invention to provide a document management system, a document management apparatus, and an authentication method that eliminate the necessity of performing such a complicated operation as to input a password by the user each time he/she tries to open any of document databases, thus improving the operability or the like for the user, and a program for implementing the method, as well as a storage medium storing the program.

To attain the above object, in a first aspect of the present invention, there is provided a document management system comprising at least one client apparatus, a communication medium, a plurality of document databases capable of being accessed by the client apparatus via the communication medium; and a document management apparatus that manages the plurality of document databases such that different authentication methods are used for respective ones of the plurality of document databases when one of the at least one client apparatus having made an access request so as to open any of the plurality of document databases is authenticated, and makes settings such that the one client apparatus is not required to be authenticated again when accessing another one of the plurality of document databases after the one client apparatus has been authenticated.

Preferably, each of the document databases holds user information indicative of at least one client apparatus, as the at least one client apparatus, that can access each of the document databases, and authentication method information indicative of an authentication method usable for each of the document databases, and the document management apparatus determines whether the one client apparatus having made an access request has an access right according to the user information held in one of the document databases to be accessed, and is operable when determining that the one client apparatus has the access right, for determining an authentication method usable for the one of the document databases to be accessed according to the authentication method information held in the one of the document databases and for providing control to authenticate the one client apparatus by the determined authentication method.

Preferably, the document management apparatus is operable when determining that the one client apparatus does not have the access right, for informing the one client apparatus that the one client apparatus does not have the access right via the communication medium.

More preferably, the document management system according to the first aspect comprises an authentication apparatus capable of communicating with the document management apparatus, and the client apparatus, and wherein the document management apparatus is operable when determining that an authentication method using the authenticating apparatus has been designated as the authentication method usable for the one of the document database to be accessed, for confirming with the authentication apparatus whether the one client apparatus has already been authenticated by the authentication apparatus, and for opening the one of the document databases to be accessed when the one client apparatus has already been authenticated.

Also preferably, the document management apparatus is operable when determining that an authentication method using the document management apparatus has been designated as the authentication method usable for the one of the document database to be accessed, for authenticating the one client apparatus by the document management apparatus and for opening the one of the document databases to be accessed when the one client apparatus has already been authenticated.

More preferably, the document management apparatus is operable when determining that the one client apparatus has not been authenticated, for requesting the one client apparatus to input necessary information for authentication via the communication medium.

In the document management system according to the first aspect of the present invention, the document management apparatus that manages the plurality of document databases such that different authentication methods are used for respective ones of the plurality of document databases when one of the at least one client apparatus having made an access request so as to open any of the plurality of document databases is authenticated, and makes settings such that the one client apparatus is not required to be authenticated again when accessing another one of the plurality of document databases after the one client apparatus has been authenticated. This eliminates the necessity of carrying out user authentication required each time the user opens any of document databases as in the prior art. As a result, as is distinct from the prior art, it is unnecessary for the user to carry out such a complicated operation as to input a password each time he/she opens any of document databases, and this improves the operability for the user.

Further, since an authentication method in which the client apparatus is authenticated using an external authentication apparatus can be designated when the client apparatus having made an access request so as to open a desired document database is authenticated, it is unnecessary to register and manage the user for each document database as in the prior art, and this improves the efficiency in system maintenance and management.

Further, since each document database needs to hold only user information indicative of the client apparatus accessible to the document database and an authentication method that can be used for the document database, it is possible to prevent password leakage which would occur in the case where users' passwords are stored in respective document databases as in the prior art. As a result, the security can be improved.

To attain the above object, in a second aspect of the present invention, there is provided document management apparatus that manages a plurality of document databases capable of being accessed by a client apparatus via a communication medium, comprising a controller that manages the plurality of document databases such that different authentication methods are used for respective ones of the plurality of document databases when the client apparatus having made an access request so as to open any of the plurality of document databases is authenticated, and makes settings such that the client apparatus is not required to be authenticated again when accessing another one of the document databases after the client apparatus has been authenticated.

Preferably, each of the document databases holds user information indicative of the client apparatus that can access each of the document databases, and authentication method information indicative of an authentication method usable for each of the document databases, and the controller determines whether the client apparatus having made an access request has an access right according to the user information held in one of the document databases to be accessed, and is operable when determining that the client apparatus has the access right, for determining an authentication method usable for the one of the document databases to be accessed according to the authentication method information held in the one of the document databases and for providing control to authenticate the client apparatus by the determined authentication method.

More preferably, the controller is operable when determining that the client apparatus does not have the access right, for informing the one client apparatus that the client apparatus does not have the access right via the communication medium.

Also preferably, the controller is operable when determining that an authentication method using an authentication apparatus capable of communicating with the document management apparatus and the client apparatus has been designated as the authentication method usable for the one of the document database to be accessed, for confirming with the authentication apparatus whether the client apparatus has already been authenticated by the authentication apparatus, and for opening the one of the document databases to be accessed when the client apparatus has already been authenticated.

Preferably, the controller is operable when determining that an authentication method using the document management apparatus has been designated as the authentication method usable for the one of the document database to be accessed, for authenticating the client apparatus by the document management apparatus and for opening the one of the document databases to be accessed when the client apparatus has already been authenticated.

More preferably, the controller is operable when determining that the client apparatus has not been authenticated, requesting the client apparatus to input necessary information for authentication via the communication medium.

The document management apparatus according to the second aspect can obtain the same effects as in the first aspect.

To attain the above object, in a third aspect of the present invention, there is provided an authentication method executed by a document management system comprising a plurality of document databases capable of being accessed by a client apparatus via a communication medium, and a document management apparatus that manages the plurality of document databases, the method comprising a control step of managing the plurality of document databases such that different authentication methods are used for respective ones of the plurality of document databases when the client apparatus having made an access request so as to open any of the plurality of document databases is authenticated, and making settings such that the client apparatus is not required to be authenticated again when accessing another one of the document databases after the client apparatus has been authenticated.

Preferably, each of the document databases holds user information indicative of the client apparatus that can access each of the document databases, and authentication method information indicative of an authentication method usable for each of the document databases, and the control step comprises providing control such that whether the client apparatus having made an access request has an access right is determined according to the user information held in one of the document databases to be accessed, and when it is determined the client apparatus has the access right, an authentication method usable for the one of the document databases to be accessed is determined according to the authentication method information held in the one of the document databases, and the client apparatus is authenticated by the determined authentication method.

More preferably, the control step comprises informing the client apparatus that the client apparatus does not have access right via the communication medium when it is determined that the client apparatus does not have access right.

Also preferably, the control step comprises confirming with an authentication apparatus capable of communicating with the document management apparatus and the client apparatus whether the client apparatus has already been authenticated by the authentication apparatus when it is determined that an authentication method using the authentication apparatus has been designated as the authentication method usable for the one of the document database to be accessed, and opening the one of the document databases to be accessed when the client apparatus has already been authenticated.

Preferably, the control step comprises authenticating the client apparatus by the document management apparatus when it is determined that an authentication method using the document management apparatus has been designated as the authentication method usable for the one of the document database to be accessed, and opening the one of the document databases to be accessed when the client apparatus has already been authenticated.

More preferably, the control step comprises requesting the client apparatus to input necessary information for authentication via the communication medium when it is determined that the client apparatus has not been authenticated.

The authentication method apparatus according to the third aspect can obtain the same effects as in the first aspect.

To attain the above object, in a fourth aspect of the present invention, there is provided a program for causing a computer to execute an authentication method implemented by a document management system comprising at least one client apparatus, a communication medium, a plurality of document databases capable of being accessed by the client apparatus via the communication medium, and a document management apparatus that manages the plurality of document databases, the program comprising a control module for managing the plurality of document databases such that different authentication methods are used for respective ones of the plurality of document databases when the client apparatus having made an access request so as to open any of the plurality of document databases is authenticated, and making settings such that the client apparatus is not required to be authenticated again when accessing another one of the document databases after the client apparatus has been authenticated.

Preferably, each of the document databases holds user information indicative of the client apparatus that can access each of the document databases, and authentication method information indicative of an authentication method usable for each of the document databases, and the control module provides control such that whether the client apparatus having made an access request has an access right is determined according to the user information held in one of the document databases to be accessed, and when it is determined the client apparatus has the access right, an authentication method usable for the one of the document databases to be accessed is determined according to the authentication method information held in the one of the document databases, and the client apparatus is authenticated by the determined authentication method.

More preferably, the control module informs the client apparatus that the client apparatus does not have access right via the communication medium when it is determined that the client apparatus does not have the access right.

Also preferably, when it is determined that an authentication method using an authentication apparatus capable of communicating with the document management apparatus and the client apparatus has been designated as the authentication method usable for the one of the document database to be accessed, the control module confirms with the authentication apparatus whether the client apparatus has already been authenticated by the authentication apparatus, and opens the one of the document databases to be accessed when the client apparatus has already been authenticated.

Preferably, the control module authenticates the client apparatus by the document management apparatus when it is determined that an authentication method using the document management apparatus has been designated as the authentication method usable for the one of the document database to be accessed, and opening the one of the document databases to be accessed when the client apparatus has already been authenticated.

More preferably, the control module requests the client apparatus to input necessary information for authentication via the communication medium when it is determined that the client apparatus has not been authenticated.

The program according to the fourth aspect can obtain the same effects as in the first aspect.

To attain the above object, in a fifth aspect of the present invention, there is provided a computer-readable storage medium storing a program for implementing an authentication method to be executed by a document management system comprising at least one client apparatus, a communication medium, a plurality of document databases capable of being accessed by the client apparatus via the communication medium, and a document management apparatus that manages the plurality of document databases, the program comprising a control module for managing the plurality of document databases such that different authentication methods are used for respective ones of the plurality of document databases when the client apparatus having made an access request so as to open any of the plurality of document databases is authenticated, and making settings such that the client apparatus is not required to be authenticated again when accessing another one of the document databases after the client apparatus has been authenticated.

Preferably, each of the document databases holds user information indicative of the client apparatus that can access each of the document databases, and authentication method information indicative of an authentication method usable for each of the document databases, and the control module provides control such that whether the client apparatus having made an access request has an access right is determined according to the user information held in one of the document databases to be accessed, and when it is determined the client apparatus has the access right, an authentication method usable for the one of the document databases to be accessed is determined according to the authentication method information held in the one of the document databases, and the client apparatus is authenticated by the determined authentication method.

More preferably, the control module informs the client apparatus that the client apparatus does not have access right via the communication medium when it is determined that the client apparatus does not have the access right.

Also preferably, when it is determined that an authentication method using an authentication apparatus capable of communicating with the document management apparatus and the client apparatus has been designated as the authentication method usable for the one of the document database to be accessed, the control module confirms with the authentication apparatus whether the client apparatus has already been authenticated by the authentication apparatus, and opens the one of the document databases to be accessed when the client apparatus has already been authenticated.

Preferably, the control module authenticates the client apparatus by the document management apparatus when it is determined that an authentication method using the document management apparatus has been designated as the authentication method usable for the one of the document database to be accessed, and opening the one of the document databases to be accessed when the client apparatus has already been authenticated More preferably, the control module requests the client apparatus to input necessary information for authentication via the communication medium when it is determined that the client apparatus has not been authenticated.

The storage medium according to the fifth aspect can obtain the same effects as in the first aspect.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
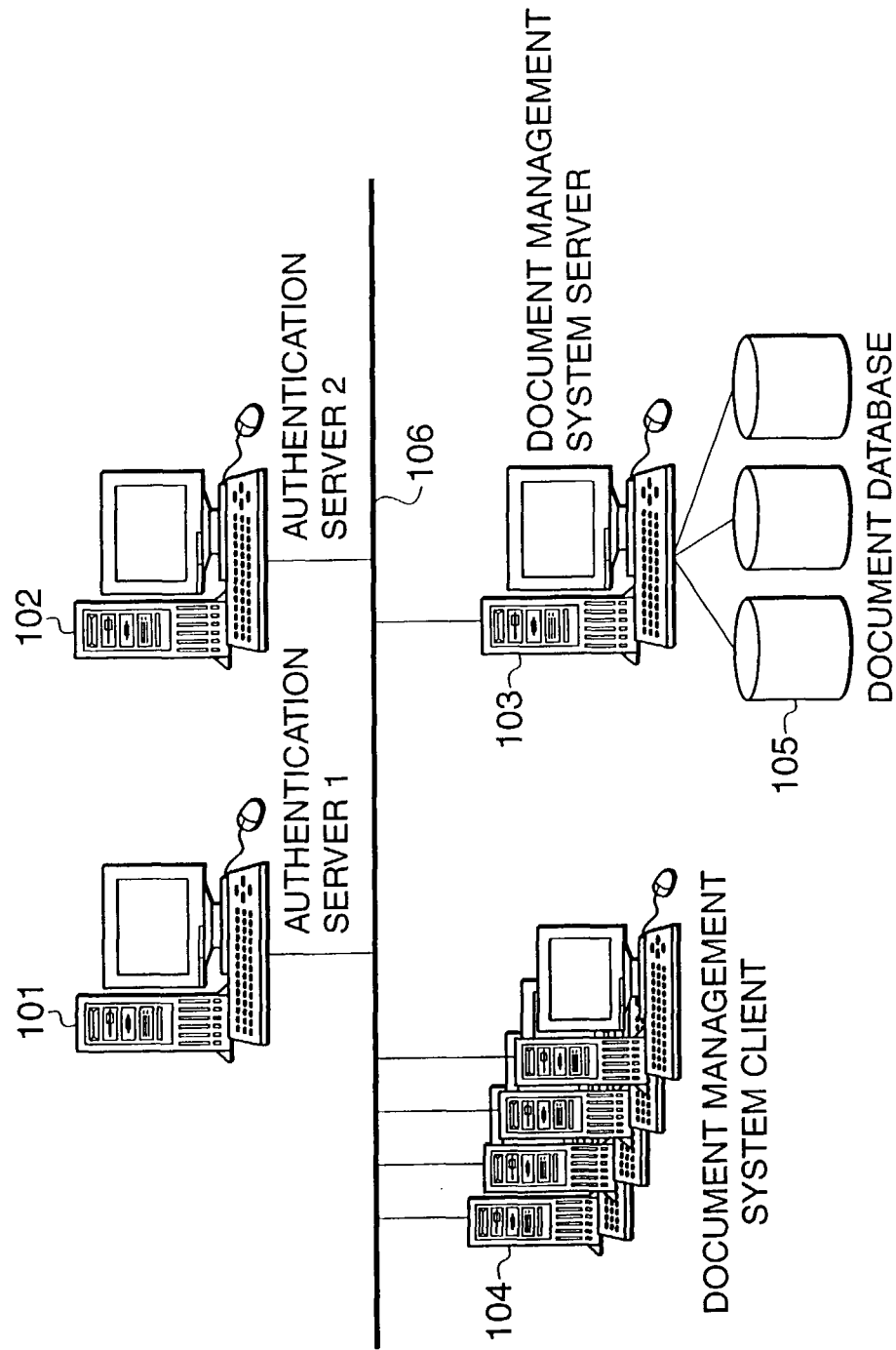
FIG. 1 is a view schematically showing an example of the arrangement of a network on which a document management system according to an embodiment of the present invention can operate.

FIG. 1 is a view schematically showing an example of the arrangement of a network on which a document management system according to an embodiment of the present invention can operate.

In FIG. 1, the document management system according to the present embodiment is constructed such that a plurality of authentication servers, i.e. an authentication server (1) 101 and an authentication server (2) 102, a document management system server 103 that manages a plurality of document databases 105, and a plurality of document management system clients 104 are connected to each other via a network 106.

The document management system according to the present embodiment is capable of creating a plurality of document databases and defining different access control for the respective document databases, and the plurality of document databases are managed by the document management system server 103 such that different authentication methods are used for the respective document databases 105 (authentication method conforming to system environment) when a document management system client 104 having made an access request so as to open any of the document databases 105 is authenticated. Further, in the document management system according to the present embodiment, after the document management system client 140 has been authenticated in making an access request so as to open any of the document databases 105, the same document management system client 104 is allowed to open the other document databases 105 without being authenticated again.

Specifically, the document management system server 103 manages the document management system such that different authentication methods are used for the respective document databases 105 when the document management system 104 having made an access request so as to open any of the document databases 105 is authenticated, and after the document management system client 104 is authenticated (OK), the document management system client 104 does not have to be authenticated again when accessing the other document databases 105.

The document management system server 103 is a server in which the document management system according to the present invention is working, and is comprised of an information processing apparatus. The plurality of document databases 105 are managed by the document management system server 103. The authentication server 101 and the authentication server 102 authenticate the user when he/she gives a document database access request to the document management system server 103, and are each comprised of an information processing apparatus. The document management system clients 104 are each a client that is operated by the user who uses any of the plurality of document databases 105 via the document management system server 103, and is comprised of an information processing apparatus.

The document management system server 103 is capable of managing the plurality of document databases 105 as described above. Each of the plurality of document databases 105 holds document information, user information concerning users (document management system clients 104) who can access each of the document databases 105, and information concerning authentication service to be provided when the user (document management system client 104) is authenticated so as to access the document database 105 (database profile information), that is, information indicative of an authentication method.

It goes without saying that, when exchanging authentication information with the authentication server 101 or 102, the document management system server 103 uses a standard encryption means such as SSL (Secure Sockets Layer: a system proposed by Netscape Communications Corporation in the U.S. in which a security function is applied when data is transferred between networks) on the Internet to maintain the security on communication channels.

Although in the present embodiment, authentication systems assumed to be usually operating on existing network infrastructures in many cases, such as LDAP (Lightweight Directory Access Protocol) server, Windows (registered trademark) NT domain authentication system, or Lotus Notes authentication system, are used as the authentication servers 101 and 102, the present invention is not limited to this, but other authentication systems may be used as the authentication servers 101 and 102 with satisfactory effects.

Figure 2:
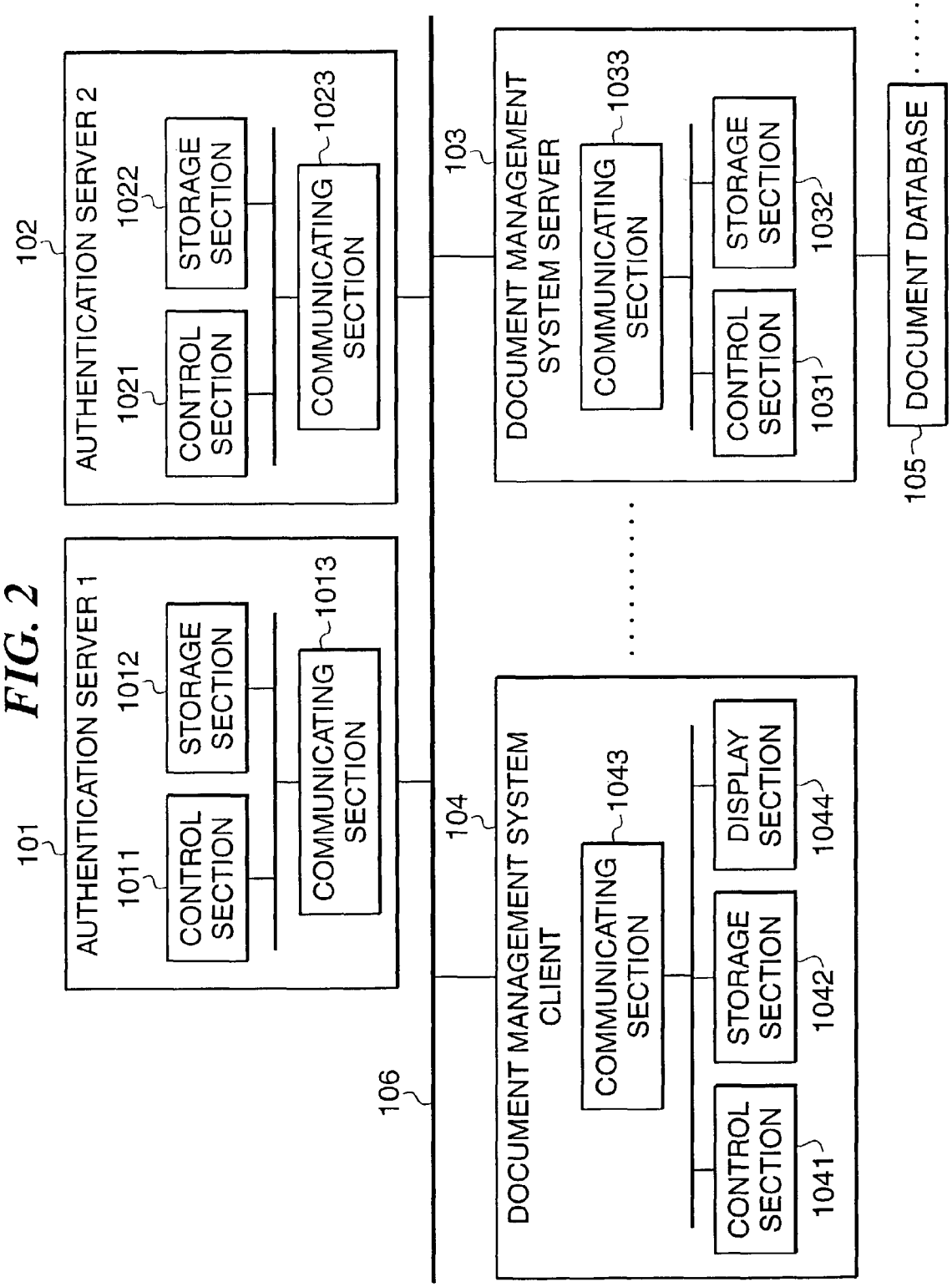
FIG. 2 is a block diagram showing an example of the internal construction of a document management system server, a document database, an authenticating sever, and a document management system client, all appearing in FIG. 1.

FIG. 2 is a block diagram showing an example of the internal construction of the authentication servers 101 and 102, the document management system server 103, the document databases 105, and the document management system client 104 in FIG. 1.

In FIG. 2, the authenticating sever 101 is comprised of a control section 1011, a storage section 1012, and a communicating section 1013, and the authentication server 102 is comprised of a control section 1021, a storage section 1022, and a communicating section 1023. The document management system server 103 is comprised of a control section 1031, a storage section 1032, and a communicating section 1033. Each of the document databases 105 holds the above described document information, user information, and database profile information. The document management system client 104 is comprised of a control section 1041, a storage section 1042, a communicating section 1043, and a display section 1044.

Incidentally, FIG. 2 only shows the basic construction of component parts related to the present embodiment, wherein a ROM, a RAM, a hard disk, and so forth are collectively illustrated as each storage section for the convenience of explanation, and component parts not directly related to the present embodiment are omitted from FIG. 1.

In the authentication server 101, the control section 1011 controls the operation of component parts of the authentication server 101 to authenticate users (document management system clients 104). The storage section 1012 stores information required for user authentication and other information. The communicating section 1013 carries out data communication with the document management system server 103 and the document management system clients 104 via the network 106.

In the authentication server 102, the control section 1021 controls the operation of component parts of the authentication server 102 to authenticate users (document management system clients 104). The storage section 1022 stores information required for user authentication and other information. The communicating section 1023 carries out data communication with the document management system server 103 and the document management system clients 104 via the network 106.

Figure 3:
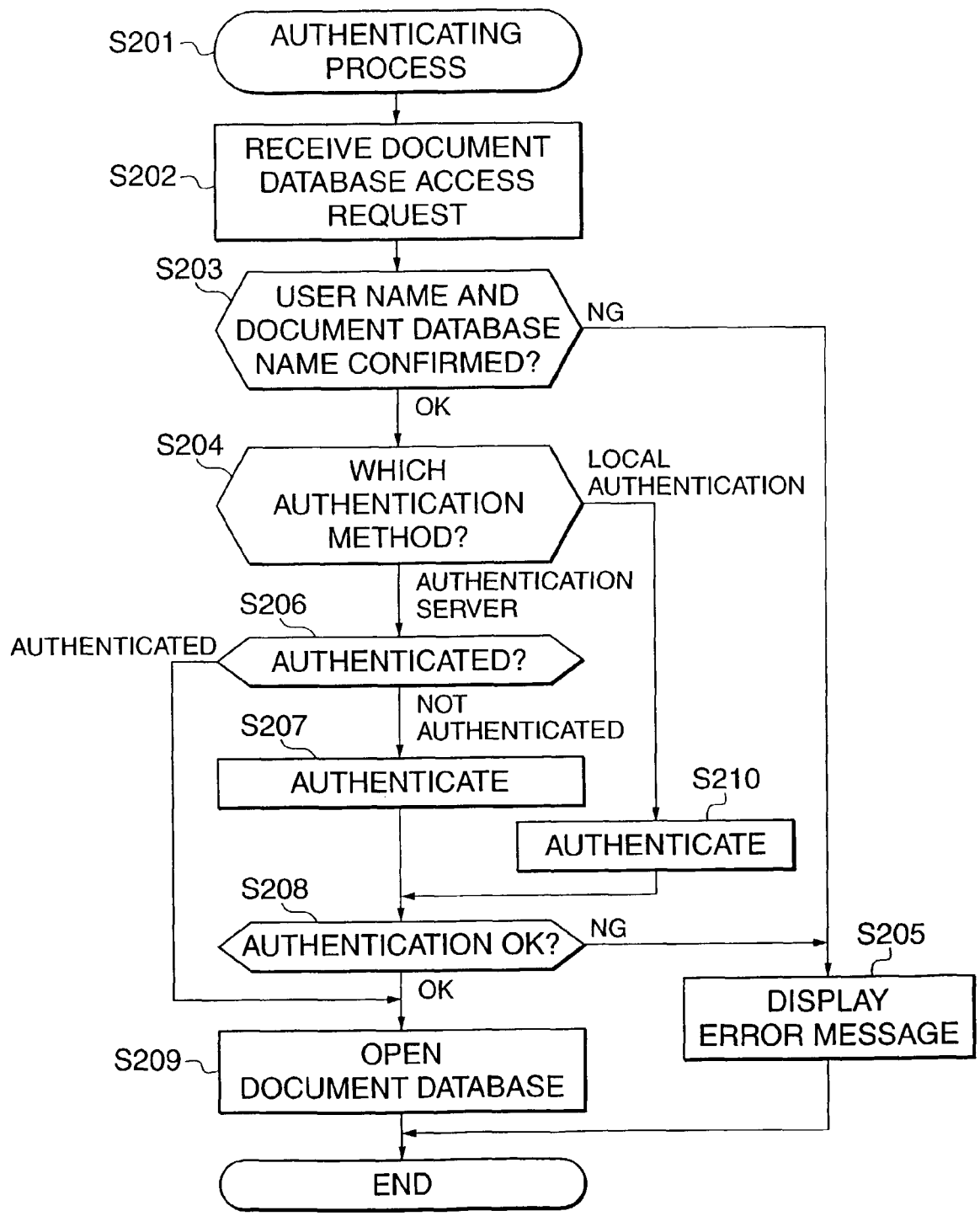
FIG. 3 is a flow chart showing an authenticating process carried out by the document management system server.

In the document management system server 103, the control section 1031 controls the operation of component parts of the document management system server 103, manages the document databases 105, and executes an authenticating process sequence shown in FIG. 3 according to a program stored in the storage section 1032. The storage section 1032 stores information required for the authenticating process and other information. The communicating section 1033 carries out data communication with the authentication servers 101 and 102 and the document management system clients 104 via the network 106.

Figure 4:
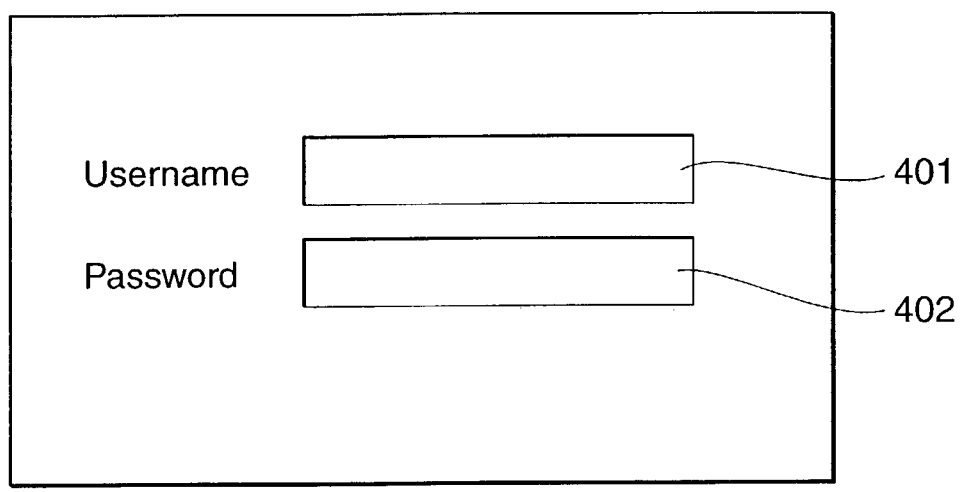
FIG. 4 is a view showing an example of an authentication screen displayed on a display section of the document management system client.

In the document management system client 104, the control section 1041 controls the operation of component parts of the document management system client 104. The storage section 1042 stores a variety of information. The communicating section 1043 carries out data communication with the authentication servers 101 and 102 and the document management system server 103 via the network 106. The display section 1044 displays an authentication screen that requests the input of necessary information for user authentication (a user name and a password) as shown in FIG. 4.

Next, referring to FIGS. 1 to 4, a detailed description will be given of an authenticating process carried out by the document management system server 103 of the document management system according to the present embodiment.

FIG. 3 is a flow chart showing the authenticating process carried out by the document management system server 103.

In FIG. 3, the document management system server 103 starts the authenticating process (step S201). When receiv a document database access request intended for opening a document database 105 managed by the document management system server 103 from a document management system client 104 (step S202), the document management system server 103 performs processing described below. Specifically, the document management system server 103 refers to the user information held by the document database 105 according to a user name and a document database name specified in the document database access request given from the document management system client 104 to thereby ascertain whether the specified user has the right to access the designated document database 105 (step S203).

If determining that the specified user does not have the right to access the designated document database 105 ("NG" in the step S203), the document management system server 103 then transmits display data for displaying the fact that the specified user does not have the access right to the document management system client 104 via the network 106, so that a message indicative of the fact that the specified user does not have the access right is displayed as an error message on a screen of the display section 1044 of the document management system client 104 (step S205), and the process is terminated.

On the other hand, if determining that the specified user has the right to access the designated document database 105 ("OK" in the step S203), the document management system server 103 ascertains whether an authentication method usable for the designated document database 105 is an authentication method using the external authentication server 101 or 102 or a local authentication method using the document management system server 103 according to the database profile information obtained from the document database 105 (step S204).

If determining that an authentication method usable for the designated document database 105 is the local authentication method ("local authentication" in the step S204), the document management system server 103 authenticates the user (step S210). After the end of processing in the step S210, the process proceeds to a step S208, described later.

On the other hand, if determining that an authentication method usable for the designated document database 105 is the authentication method using the external authentication server 101 or 102 ("authentication server" in the step S204), the document management system server 103 confirms with the authentication server 101 or 102 via the network 106 whether the user of the document management system client 104 required to be authenticated has already been authenticated or not (step S206).

If determining that the user has already been authenticated as a result of the confirmation with the authentication server 101 or 102 ("authenticated" in the step S206), the document management system server 103 opens the designated document database 105 based on the determination that the user has already been authenticated by the authentication server 101 or 102 (step S209).

If determining that the user has not yet been authenticated as a result of the confirmation with the authentication server 101 or 102 ("not authenticated" in the step S206), the document management system server 103 transmits display data for displaying an authentication screen requesting the input of necessary information for user authentication to the document management system client 104 via the network 106 to thus display the authentication screen in FIG. 4 on the display section 1044 of the document management system client 104, and transmits an authentication request to the authentication server 101 or 102 corresponding to the authentication method determined in the step S204 (step S207).

On this occasion, the user inputs his/her user name in a user name field 401 and his/her password in a password field 402 on the authentication screen displayed on the display section 1044 of the document management system client 104.

If determining that the user has been authenticated by the authentication server 101 or 102 in accordance with the authentication request given to the authentication server 101 or 102 ("OK" in the step S208), the document management system server 103 opens the designated document database 105 (step S209), and the process is terminated.

As described above, once the user has been authenticated in making access to any of the document databases 105, he/she is not required to be authenticated again when accessing any one of the other document databases 105.

On the other hand, if determining that the user has not yet been authenticated by the authentication server 101 or 102 ("NG" in the step S208), the document management system server 103 transmits display data for displaying the fact that the user cannot be authenticated to the document management system client 104 via the network 106 so that a message indicative of the fact that the user cannot be authenticated is displayed as an error message on the display section 1044 of the document management system client 104 (step S205), and the process is terminated.

Incidentally, in the present embodiment, considering the possibility that the document management system according to the present embodiment is applied to an environment which has no user authentication resource (authentication system) on an existing network infrastructure, it may be configured as in the prior art that the user is authenticated based on the above described user information held in the document databases 105 managed by the document management system server 103 without using any external authentication server as an authentication system.

Further, the program executed by the document management system according to the present embodiment may be installed from outside and executed by the document management system server 103. In this case, the present invention may be applied to the case where the program is supplied to the document management system server 103 by loading a group of information including the program from a storage medium, such as a CD-ROM, a flash memory, or a floppy (registered trademark) disk, or the like, or from an external storage medium into the document management system server 103 via a network such as an electronic mail network or a personal computer communication network.

As described above, according to the present embodiment, the document management system server 103 manages the plurality of document databases 105 such that different authentication methods are used for the respective document databases 105 when the document management system client 104 having made an access request so as to open any of the document databases 105 is authenticated, and makes settings such that the document management system client 104 is not required to be authenticated again when accessing any one of the other document databases 105 after the document management system client 104 has been authenticated. This eliminates the necessity of authenticating the user each time he/she tries to open a document database as in the prior art, and thus eliminates the necessity of performing such a complicated operation as to input a password each time the user tries to open a document database. As a result, the operability for the user can be improved.

Further, since the authentication method using the external authentication server 101 or 102 can be designated when the document management system client 104 having made an access request so as to open a desired document database is authenticated, it is unnecessary to register and manage users for respective document databases as in the prior art. As a result, it is possible to improve the efficiency in system maintenance and management.

Further, since each of the document databases 105 needs to hold only the user information concerning the document management system clients 104 which can access the document databases 105 and the database profile information concerning the authentication service to be provided when the document management system clients 104 access the document databases 105, it is possible to prevent password leakage which would occur if individual users' passwords are stored for respective document databases as in the prior art, and to thus improve the security.

Although in the present embodiment, the document management system client 104 is comprised of a desktop information processing apparatus, the present invention is not limited to this, but the document management system client 104 may be comprised of a mobile information terminal capable of communicating with the document management system server 103 and the authentication servers 101 and 102 via a wireless communication system such as the Bluetooth wireless communication system so that the user can give an access request to the document management system server 103 from a remote place where he/she is and open a desired one of the document databases 105.

Further, although in the present embodiment, the network on which the document management system can operate is constructed as shown in FIG. 1, the present invention is not limited to this, but the number and arrangement of the document management system server 103, the document databases 105, the authentication servers 101 and 102, and the document management system clients 104 may be arbitrarily determined.

Further, the present invention may either be applied to a system or an integrated apparatus composed of a plurality of apparatuses (such as a host computer, interface equipment, a reader, and so forth) or to a single apparatus.

Further, it is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, a ROM, and a download carried out via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment thereof may be accomplished by writing the program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A document management system comprising:
a client apparatus;
a document management apparatus that manages a plurality of document databases;
an authentication apparatus capable of communicating with said document management apparatus; and
a plurality of document databases capable of being accessed by said client apparatus and said document management apparatus, wherein each of said plurality of document databases is pre-designated with either a first authentication method or a second authentication method, the first and second authentication method being used for access to said each of the document databases,
wherein the first authentication method is executed in the document management apparatus, and the second authentication method is executed using the authentication apparatus,
wherein the client apparatus, the document management apparatus and the authentication are apparatus are located at different locations on a network, wherein the authentication apparatus and the plurality of document databases are located at different locations on the network, wherein said document management apparatus comprises a CPU executing the following steps:

a receiving step of receiving an access request from the client apparatus, an access to one of said plurality of document databases being requested in the access request;

an access right determining step of determining whether the client apparatus having made the access request has an access right based on user information held in the document databases to be accessed;

an informing step of informing, when said access right determining step determines that the client apparatus does not have the access right, the client apparatus that the client apparatus does not have the access right;

a determining step of determining, when said access right determining step determines that the client apparatus has the access right, whether the authentication method of the document database requested in the access request is the first authentication method or the second authentication method;

a first authenticating step of executing the first authentication method for the client apparatus in the document management apparatus when said determining step determines that the authentication method of the requested document database is the first authentication method, wherein the client apparatus is always required to be authenticated by said document management apparatus regardless of whether or not the client apparatus has already been authenticated by any one of said document management apparatus and said authentication apparatus when the client apparatus requests to access one of the plurality of document databases for which the first authentication method is used; and a second authenticating step of executing the second authentication method for the client apparatus by transmitting an authentication request to the authentication apparatus in the case where the client apparatus has not been authenticated by said authentication apparatus when said determining step determines that the authentication method of the requested document database is the second authentication method, regardless of whether or not the client apparatus has already been authenticated by said document management apparatus, and wherein the second authenticating step is not required to execute the second authentication method again when the client apparatus requests to access another one of the plurality of document databases, for which the second authentication method is used, after the client apparatus has been authenticated by said second authenticating step, regardless of whether or not the client apparatus has already been authenticated by said document management apparatus.

2. A document management system according to claim 1, wherein said CPU further executes an opening step of opening the requested document database to the client apparatus when the client apparatus is authenticated by said first authenticating step or said second authenticating step.

3. A document management system according to claim 1, wherein said document management apparatus is operable when determining that the client apparatus has not been authenticated by said first authenticating step or said second authenticating step, for requesting the client apparatus to input necessary information for authentication.

4. A document management apparatus that manages a plurality of document databases capable of being accessed by a client apparatus and that communicates with an authentication apparatus, wherein each of said plurality of document databases is pre-designated with either a first authentication method or a second authentication method, the first and second authentication method being used for access to said each of the document databases, wherein the client apparatus, the document management apparatus and the authentication apparatus are located at different locations on a network, wherein the authentication apparatus and the plurality of document databases are located at different locations on the network, the document management apparatus comprising a CPU executing the following steps:

a receiving step of receiving an access request from the client apparatus, an access to one of said plurality of document databases being requested in the access request;

an access right determining step of determining whether the client apparatus having made the access request has an access right based on user information held in the document databases to be accessed;

an informing step of informing, when said access right determining step determines that the client apparatus does not have the access right, the client apparatus that the client apparatus does not have the access right;

a determining step of determining, when said access right determining step determines that the client apparatus has the access right, whether the authentication method of the document database requested in the access request is the first authentication method or the second authentication method;

a first authenticating step of executing a first authentication for the client apparatus in the document management apparatus when said determining step determines that the authentication method of the requested document database is the first authentication method, wherein the client apparatus is always required to be authenticated by said document management apparatus regardless of whether or not the client apparatus has already been authenticated by any one of said document management apparatus and said authentication apparatus when the client apparatus requests to access one of the plurality of document databases for which the first authentication method is used; and a second authenticating step of executing the second authentication method for the client apparatus by transmitting an authentication request to the authentication apparatus in the case where the client apparatus has not been authenticated by said authentication apparatus when said determining step determines step that the authentication method of the requested document database is the second authentication method, regardless of whether or not the client apparatus has already been authenticated by said document management apparatus, and wherein the second authentication step is not required to execute the second authentication method again when the client apparatus requests to access another one of the plurality of document databases, for which the second authentication method is used, after the client apparatus has been authenticated by said second authentication means step, regardless of whether or not the client apparatus has already been authenticated by said document management apparatus.

5. A document management apparatus according to claim 4, wherein said CPU further executes an opening step of opening the requested document database to the client apparatus when the client apparatus is authenticated by said first authenticating step or said second authenticating step.

6. A document management apparatus according to claim 4, wherein said CPU further executes a requesting step of requesting the client apparatus to input necessary information for authentication when the client apparatus has not been authenticated by said first authenticating step or said second authenticating step.

7. An authentication method executed in a document management apparatus that manages a plurality of document databases and that communicates with a client apparatus and an authentication apparatus, wherein each of said plurality of document databases is pre-designated with either a first authentication method or a second authentication method, the first and second authentication method being used for access to said each of the document databases, wherein the client apparatus, the document management apparatus and the authentication apparatus are located at different locations on a network, wherein the authentication apparatus and the plurality of document databases are located at different locations on the network, the method comprising:
 a receiving step of receiving an access request from the client apparatus, an access to one of said plurality of document databases being requested in the access request;
 access right determining step for determining whether the client apparatus having made the access request has an access right based on user information held in the document databases to be accessed;
 informing step for informing, when said access right determining step determines that the client apparatus does not have the access right, the client apparatus that the client apparatus does not have the access right;
 a determining step of determining, when said access right determining step determines that the client apparatus has the access right, whether the authentication method for the document database requested in the access request is the first authentication method or the second authentication method;
 a first authenticating step of executing the first authentication method for the client apparatus in the document management apparatus when it is determined in said determining step that the authentication method of the requested document database is the first authentication method, wherein the client apparatus is always required to be authenticated by said document management apparatus regardless of whether or not the client apparatus has already been authenticated by any one of said document management apparatus and said authentication apparatus when the client apparatus requests to access one of the plurality of document databases for which the first authentication method is used; and
 a second authenticating step of executing the second authentication method for the client apparatus by transmitting an authentication request to the authentication apparatus in the case where the client apparatus has not been authenticated by said authentication apparatus when it is determined in said determining step that the authentication method of the requested document database is the second authentication method, regardless of whether or not the client apparatus has already been authenticated by said document management apparatus, and
 wherein the second authenticating step is not required to execute the second authentication method again when the client apparatus requests to access another one of the plurality of document databases, for which the second authentication method is used, after the client apparatus has been authenticated by said second authentication step, regardless of whether or not the client apparatus has already been authenticated by said document management apparatus.

8. An authentication method according to claim 7, further comprising an opening step of opening the requested document database to the client apparatus when the client apparatus is authenticated in said first authenticating step or said second authenticating step.

9. An authentication method according to claim 7, further comprising a requesting step of requesting the client apparatus to input necessary information for authentication when it is determined in said first authenticating step or said second authenticating step that the client apparatus has not been authenticated.

10. A non-transitory computer-readable storage medium storing a program for implementing an authentication method to be executed by a document management apparatus that manages a plurality of document databases and that communicates with a client apparatus and an authentication apparatus, wherein each of said plurality of document databases is pre-designated with either a first authentication method or a second authentication method, the first and second authentication method being used for access to said each of the document databases, wherein the client apparatus, the document management apparatus and the authentication apparatus are located at different locations on a network, wherein the authentication apparatus and the plurality of document databases are located a different locations on the network, the authentication method comprising:
 a receiving step of receiving an access request from the client apparatus, an access to one of said plurality of document databases being requested in the access request;
 access right determining step for determining whether the client apparatus having made the access request has an access right based on user information held in the document databases to be accessed;
 informing step for informing, when said access right determining step determines that the client apparatus does not have the access right, the client apparatus that the client apparatus does not have the access right;
 a determining step of determining, when said access right determining step determines that the client apparatus has the access right, whether the authentication method for the document database requested in the access request is the first authentication method or the second authentication method;
 a first authenticating step of executing the first authentication method for the client apparatus in the document management apparatus when it is determined in said determining step that the authentication method of the requested document database is the first authentication method, wherein the client apparatus is always required to be authenticated by said document management apparatus regardless of whether or not the client apparatus has already been authenticated by any one of said document management apparatus and said authentication apparatus when the client apparatus requests to access one of the plurality of document databases for which the first authentication method is used; and
 a second authenticating step of executing the second authentication method for the client apparatus by transmitting an authentication request to the authentication apparatus in the case where the client apparatus has not been authenticated by said authentication apparatus when it is determined in said determining step that the authentication method of the requested document database is the second authentication method, regardless of whether or not the client apparatus has already been authenticated by said document management apparatus, and wherein the second authenticating step is not required to execute the second authentication method again when the client apparatus requests to access another one of the plurality of document databases, for which the second authentication method is used, after the client apparatus has been authenticated by said second authentication step regardless of whether or not the client apparatus has already been authenticated by said document management apparatus.

11. A non-transitory storage medium according to claim 10, wherein said authentication method further comprises an opening step of opening the requested document database to the client apparatus when the client apparatus is authenticated in said first authenticating step or said second authenticating step.

12. A non-transitory storage medium according to claim 10, wherein said authentication method further comprises a requesting step of requesting the client apparatus to input necessary information for authentication when it is determined in said first authenticating step or said second authenticating step that the client apparatus has not been authenticated.

* * * * *